W. W. SIBSON & T. ALLSOP.
SINGEING MACHINE.
APPLICATION FILED MAR. 26, 1909.

1,089,085.

Patented Mar. 3, 1914.
7 SHEETS—SHEET 3.

UNITED STATES PATENT OFFICE.

WALTER W. SIBSON AND THOMAS ALLSOP, OF PHILADELPHIA, PENNSYLVANIA, ASSIGNORS TO THE PHILADELPHIA DRYING MACHINERY COMPANY, OF PHILADELPHIA, PENNSYLVANIA, A CORPORATION OF PENNSYLVANIA.

SINGEING-MACHINE.

1,089,085.    Specification of Letters Patent.    Patented Mar. 3, 1914.

Application filed March 26, 1909. Serial No. 485,967.

*To all whom it may concern:*

Be it known that we, WALTER W. SIBSON and THOMAS ALLSOP, citizens of the United States, residing at Philadelphia, in the county of Philadelphia and State of Pennsylvania, have invented certain new and useful Improvements in Singeing-Machines; and we do hereby declare the following to be a full, clear, and exact description of the invention, such as will enable others skilled in the art to which it appertains to make and use the same.

This invention relates to improvements in singeing machines, and more particularly relates to machines for singeing hosiery.

In the art as practised at the present time, great difficulty is experienced in obtaining uniformity in the singed products. This is primarily due to the fact that the stockings fail to receive uniform exposure to the action of the singeing flames, and, consequently, while certain portions of the stockings are efficiently acted upon, other portions fail to receive the same treatment, resulting in scorched products, and preventing uniformity of singeing throughout the goods.

The main and primary object of the present invention, therefore, is the provision of a singeing machine that is so constructed as to overcome the objections above noted, means being provided whereby as the stockings approach the singeing zone movement is imparted to the stockings in order to expose all the surface thereof to the singeing flames, this movement continuing during the singeing operation and being separate and distinct from the movement of the stockings incident to their travel to and through the singeing flames, whereby all portions of the stockings are uniformly exposed to the singeing flames but only for such period as to insure carbonizing of the loose fibers without scorching of the body of the fabric.

Subordinate to the foregoing, the invention further aims to provide a novel form of burner having movement relatively to the path of travel of the stockings, the burner being so mounted that the flames meet each stocking as the latter passes into the singeing zone, move in unison for a predetermined period with the stocking as it advances, whereby to be confined and concentrated upon the goods, and then return to meet the next successive stocking as it enters the singeing zone, provision being made by which to reduce or enlarge the effective singeing area of the burner, and thereby adapt it for use with either full-sized stockings, half hose or infants' sizes. By this provision either the entire burner or only a portion thereof may be used in accordance with the sizes of the stockings being operated upon, thus effecting a material saving in the volume of gas employed at the burners.

A further object of the present invention is to provide, as an adjunct to the singeing mechanism, means by which the stockings, immediately after leaving the singeing burners, are subjected to moistening or dampening, whereby ignition of projecting or raveled ends of threads in the body of the stockings is prevented, and possibility of fire to the mass of the singed stockings, by reason of smoldering stockings inadvertently entering the mass, is reduced to a minimum.

The invention also has in view the provision of an improved form of stripper by which the stockings after being singed, are removed from their supporting forms, the construction of the stripper being such as to avoid streaking or marking the goods in their removal from the forms.

Having these general objects in view, and others that will appear as the nature of the improvements is better understood, the invention consists substantially in the novel construction, combination and arrangement of parts hereinafter fully described, illustrated in the accompanying drawings, and pointed out in the appended claims.

While the form of the invention herein illustrated and described is what, at the present time, is believed to be a preferred embodiment thereof, it is obvious that the invention is susceptible of various changes, and the right is accordingly reserved to modify, change or vary the invention as falls within the spirit and scope thereof.

In the drawings

3 is a top plan view of the machine.

Referring in detail to the drawings, the numeral 1 designates the base of the herein-described machine, the body portion of which is substantially circular in form and provided with outwardly-extending supporting webs 2 and 3 that project at substantially right angles to each other from said base.

At substantially the central portion of the base 1 a conical supporting socket 4 is arranged, and seated in said socket is a vertically-disposed standard 5. To the upper portion of the standard 5 a substantially Y-shaped horizontally-disposed yoke 6 is connected, the free ends of the divided portion of said yoke receiving the upper ends of a pair of parallel vertically-arranged stay rods 7 the lower ends of which are seated in sockets 8 at the outer end of the supporting web 2. It will thus be seen that the base 1, the standard 5, the yoke 6, and the stay rods 7 constitute substantially the entire frame work of the machine, and by reason of the connection of the yoke 6 with the standard 5 and stay rods 7, a rigid structure is provided.

Seated upon the socket 4, and surrounding the lower end of the standard 5 is a bushing 9, and immediately above said bushing 9 is arranged an eccentrically-mounted hub 10 above which is located a radially-projecting bearing arm 11, the purpose of which will presently appear. The hub 10 and arm 11 surround the standard 5, and arranged in superimposed relation to these elements is a table 12, the latter being mounted for rotary movement upon the standard 5, and suitably secured against vertical movement thereon.

The table 12 is provided at its periphery with a series of vertically-disposed sockets 13 each of which receives a shaft 14 that projects from the lower end of a stocking support or form 15. Within each end of each socket 13 is formed a race-way 16 to receive anti-friction balls 17, and coöperating with said balls are bearing cones 18, the cone at the lower end of each of the shafts 14 being adjustable thereon and held in place through the medium of lock nuts 19. Therefore, it will be seen that provision is made for adjusting the cones 18 with respect to the ends of the sockets 13, which permits wear in the bearings to be readily compensated for, thus insuring proper operation of the stocking forms 15. These forms may be of any suitable material, but they are preferably tapered from their lower to their upper ends, whereby, when a stocking is placed thereon, the entire stocking, including the toe portion, will be distended sufficiently to permit the singeing flames to readily enter the interstices of the fabric and carbonize the loose fibers. As will be observed, the supports 15, by reason of the ball bearings which are provided, will freely rotate upon the table 12, the purpose of which will presently appear.

Figure 1:
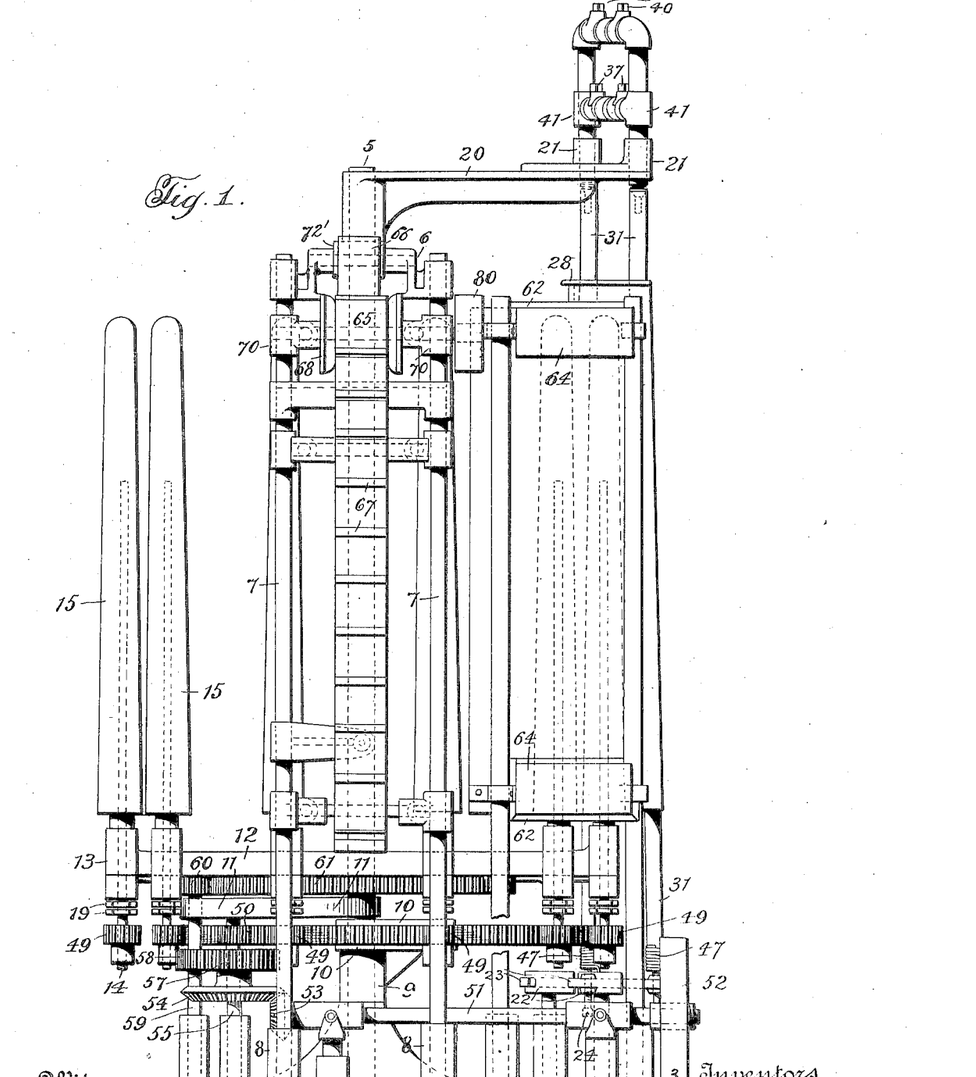
—Figure 1 is a front elevation of a singeing machine constructed in accordance with and embodying the principles of the present invention.
Figure 2:
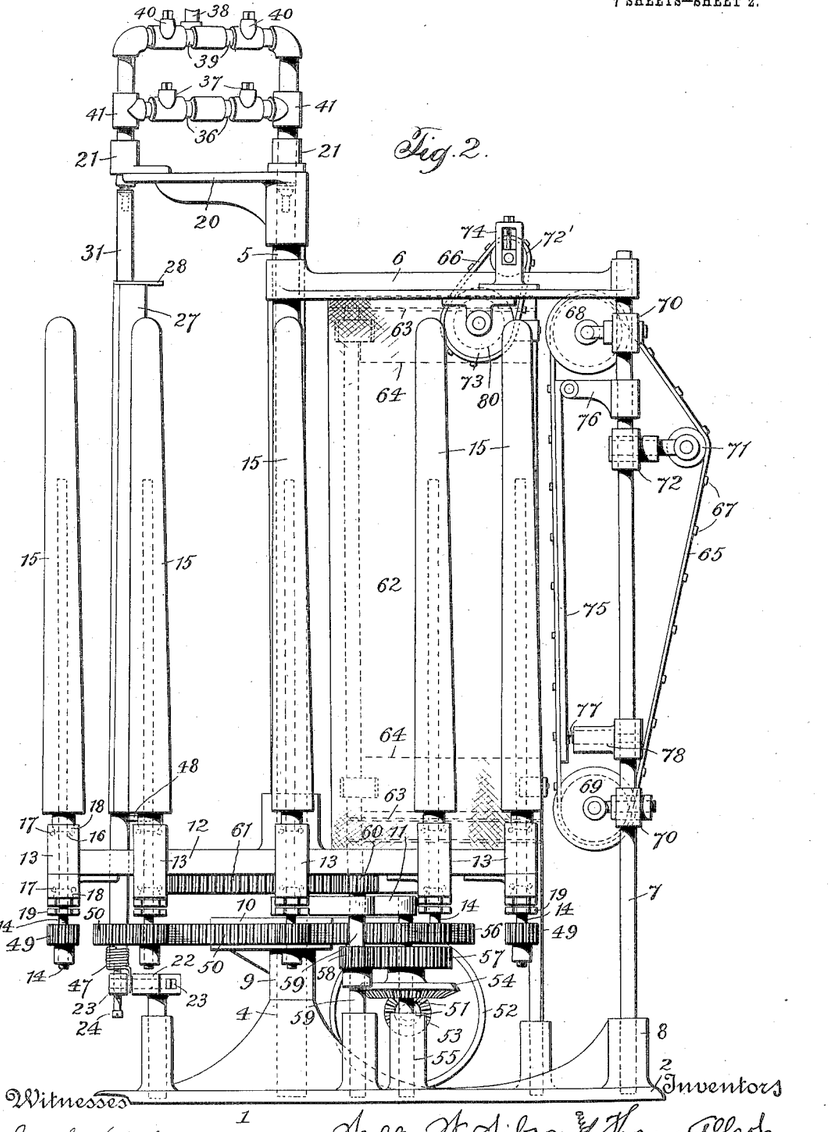
Fig. 2 is a side elevation thereof, the point of view being at right angles to that of Fig. 1. Fig.
Figure 3:
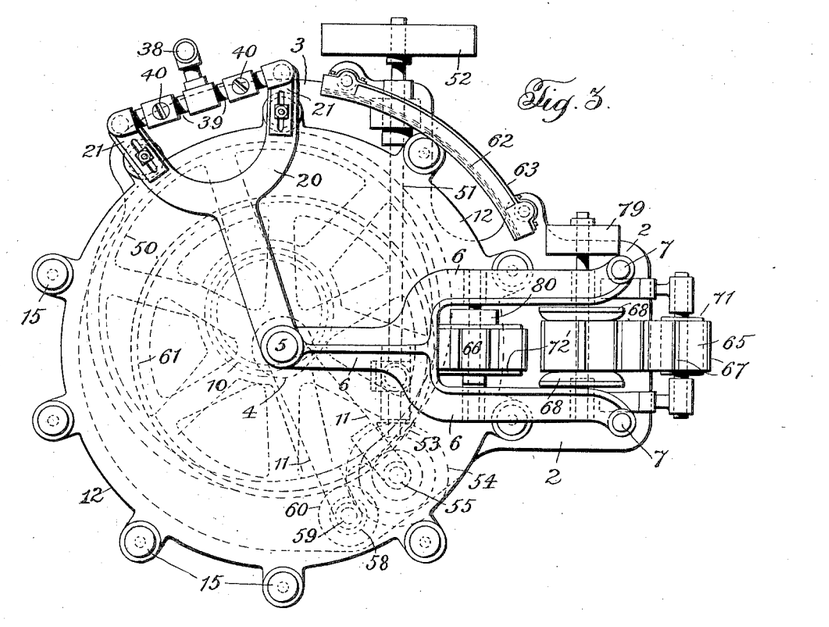
Figures 4, 6, 7:
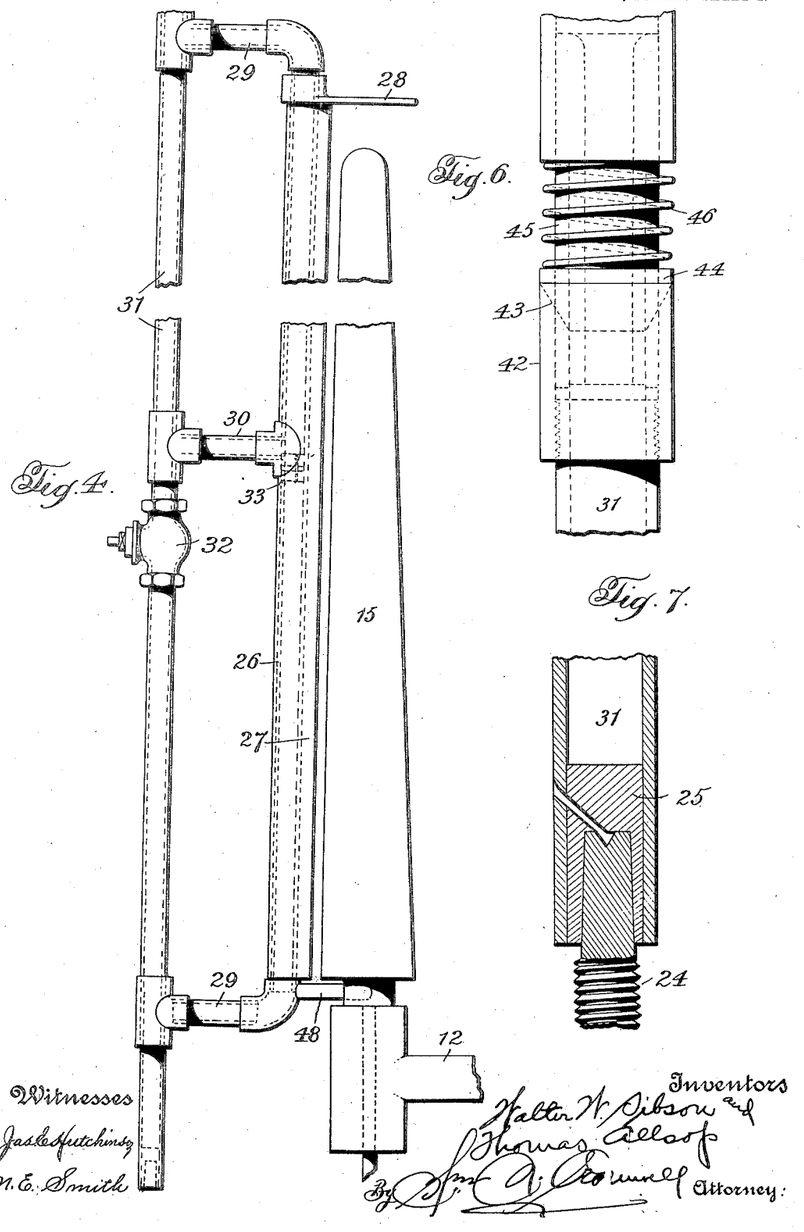
Fig. 4 is a detail elevation of one of the burners and its mounting.
Fig. 6 is a detail elevation of the swivel joint employed in connection with the burner.
Fig. 7 is a vertical transverse sectional view of the lower end of the burner and its support.
Figure 5:
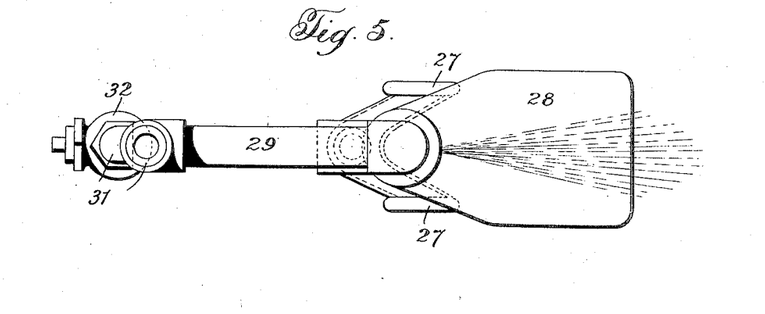
Fig. 5 is a top plan view thereof.

Arranged at one side of the supporting table 12 and in a position to freely act upon the stockings as the latter are carried by the supports 15 during the rotation of the table is the mechanism for singeing these stockings. This comprises a plurality of burners, the number, however, of which is dependent upon the amount of singeing that is required of the machine. In the present embodiment of the invention, two of these burners are employed, but it is obvious that if the demands are such as to require more or less the same can be provided in accordance with such demands. Each of the burners in question is of identically the same construction, and that they may be held in proper relation to the table 12 and its supports, a supplemental horizontally-disposed Y-shaped yoke 20 is employed, the inner end of this yoke being connected to the upper end of the standard 5, while the outer end thereof supports a pair of adjustable connecting sleeves 21 in which the upper portions of the burners are positioned. By the adjustment of the connecting sleeves 21, the burners may be moved toward and away from the supports 15, and thus the singeing flames may be projected against the stockings carried by said forms at different points removed therefrom in accordance with the conditions under which the stockings are being singed. For supporting the lower ends of the burners the base 1 is provided with vertically-adjustable holders 22 that include laterally-adjustable arms 23, and in the outer ends of said arms are arranged set screws 24 for engagement with the lower ends of the burners. This engagement is clearly illustrated in Fig. 7, wherein it will be seen that the screws 24 are received by plugs 25, carried by the burners, and by which the burners are mounted to swing in the arc of a circle the center of which is constituted by said screws 24. By the adjustability of the holders 22 in a vertical line, and also in a lateral direction by the arms 23, it is possible to raise or lower the burners, and also move the lower ends thereof in consonance with the movement of their upper ends, when the latter movement is effected by the connecting sleeves 21.

The numeral 26 designates the burner tube, this being provided with suitable perforations in a vertical line, whereby to permit escape of the gaseous fuel, and said tube has mounted thereon a longitudinally extending shield 27, whereby to confine the singeing flames at the edge of said tube that is immediately contiguous to the supports 15 in their travel past said tube. Furthermore, the upper end of the burner tube 26 is provided with a horizontally-disposed deflector 28, whereby the singeing flames at the top of the tube will be directed upon the upper end of the supports 15 and the toe portion of the stockings thereat, so that these particular portions of the stockings will receive full treatment during the singeing operation. The tube 26 is connected by end branch pipes 29 and an intermediate branch pipe 30 with a supporting tube 31, and said tube 31 is provided at a point below the intermediate branch 30 with a suitable valve 32, whereby to control flow of the gas to the lower end of said tube 31.

As before premised, it is one of the objects of the present invention to provide means by which to reduce or enlarge the effective singeing area of the burner tube 26, so that an economical use of the gas may be obtained when singeing different sizes of stockings. This is accomplished by arranging in the burner tube 26, and at a point below the connection of the intermediate branch 30, a plug 33 through the medium of which the burner tube 26 is divided into upper and lower compartments to which the flow of the gas is controlled by the valve 32. Hence, when it is desired to singe full length stockings it is obvious that the valve 32 will be open so that the gas may enter both ends of the burner tube 26, and thereby establish singeing flames throughout the length of said tube. If, however, the singeing to be done is in connection with either half hose or infants' stockings, requiring, obviously, the use of only a portion of the burner tube, the valve 32 is closed, thus confining the gas to only the upper portion of the tube 26, so that the singeing flames will only appear at that portion of the tube 26 above the plug 33.

Figure 8:
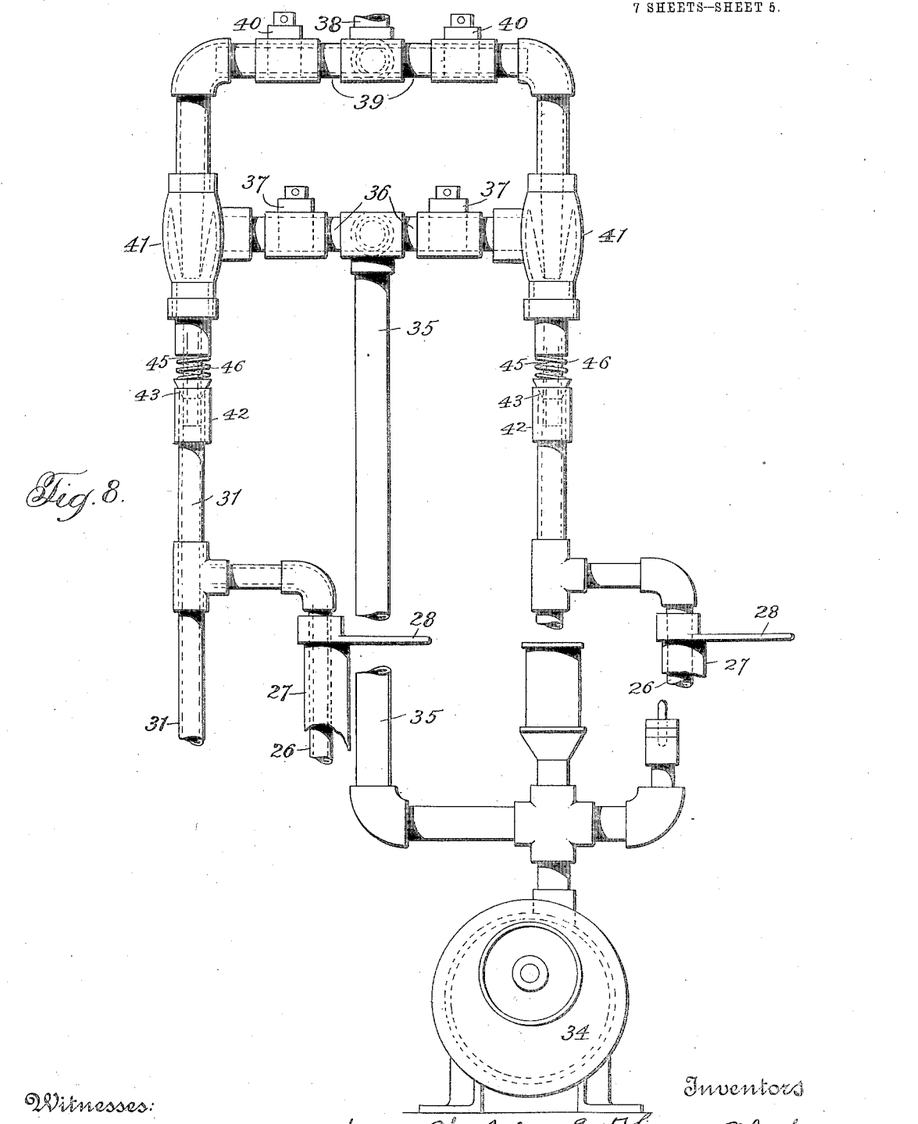
Fig. 8 is a detail elevation illustrating the blower and pipe connections for the burner, this being omitted from the other views for purposes of clearness.

By referring to Fig. 8 the arrangement for mixing the gas with the proper quantity of air, and projecting the admixture under pressure at the burners will be seen. In the figure referred to a pump 34 is illustrated, which may be of any suitable type, said pump being employed for forcing the air under pressure, and the discharge of said pump is connected to an air pipe 35 the terminal of which is provided with oppositely-projecting branches 36 in each of which is included a controlling valve 37. The numeral 38 designates a gas supply pipe, also provided at its terminal with oppositely-projecting branches 39, in each of which is included a controlling valve 40, and said branches 36 and 39 discharge into mixing T's 41, preferably in the form of ejectors that are commonly employed, whereby the air and gas are brought into intimate contact with each other. Each of the T's 41 is connected to one of the supporting tubes 31.

It has been previously indicated that the burners are mounted to swing in the arc of a circle, and to permit this, without cutting off the flow of the gas to the tubes 31 from their respective mixing devices, each of the tubes 31, at its upper end, is provided with a coupling 42 having a flared mouth 43 which receives a conical bushing 44 that is mounted upon a stem 45 and yieldingly held by a coil spring 46 that surrounds said bushing and is interposed between the conical portion thereof and the mouth of the mixing T. It will thus be seen that the supporting tube 31 is perfectly free to be swung in the manner previously mentioned, and said coil spring 46 permits vertical adjustment of the burner without impairing the joint between the tube 31 and the mixing T to which it is connected.

In the arrangement above described, it is to be observed that the mixing T's 41 are connected to the upper ends of the supporting tubes 31. This is of importance. The natural tendency of gas is to rise, and if fed into the lower ends of the tubes 31, the singeing flames would be most intense at the upper ends of the burner tubes 26. However, by forcing the singeing agent into the upper ends of the tubes 31, and into the burner tubes 26 through the branches 29 and 30, an even distribution of the gas is effected, and the tendency of the gas to rise with the objectionable results above stated is counteracted.

As before stated, the present invention provides means by which each of the burners moves relatively to the path of travel of the stockings so that the flames meet each stocking as the latter passes into the singeing zone, move in unison with the stocking as it advances, and then return to meet the next successive stocking as it enters the singeing zone. This is the purpose of mounting the burners to swing in the arc of a circle, and that the burner tubes 26 may be normally projected toward each of the stocking supports 15 as the latter advance to the burners, each of the supporting tubes 31 has a retractile spring 47 at its lower end, one end of which spring is connected to said tube, and the other connected to the arm 23. These springs cause the burners to be positioned in such manner that in the operation of the machine the singeing flames will meet each of the stockings slightly before the support 15 bearing the same arrives opposite the burner tubes 26, and in order that the burner tubes may follow each of the supports 15, and move in unison therewith, a contact arm 48 is provided at the lower end of each of the burner tubes 26, which arms project into the path of movement of said supports. Consequently, as each support is about to enter the singeing zone the contact arm 48 of the first burner is engaged by the support 15, and as the support 15 advances the burner swings therewith and moves about its pivot until the support has advanced to a point where the arm 48 is released, whereupon the spring 47 asserts itself and returns the burner to its normal position, and in the latter the contact arm 48 is presented for engagement with the next succeeding support 15, this alternate engagement and release recurring during the rotation of the table 12.

That there may be uniformity of singeing in the treatment of the stockings, and prevention of scorching of the body of the fabric, it is contemplated to impart to each of the forms 15 rotary movement as the form is about to enter the singeing zone. To the accomplishment of this end the lower end of the shaft 14 of each of said forms is provided with a pinion 49, said pinions engaging with a gear 50 that is mounted upon the eccentric hub 10, thereby positioning the gear 50 eccentrically with relation to the standard 5. Thus it will be seen that a segment of the gear 50 lies in a plane that is substantially coincident with that occupied by the inner edges of the pinions 49 as the latter pass through the singeing zone, and in this position the pinions 49 and the segmental portion of the gear 50 referred to interengage, the direction of rotation of the gear 50 being opposite to the direction of movement of the supports 15, by which a whirling movement is imparted to each of the supports 15 until the supports move past the last burner, and at this point the pinions 49 swing out of engagement with the teeth of the gear 50. This is caused, of course, by the fact that the table 12, which carries the supports 15, is concentric with the standard 5, and while the supports 15 continue in their movement with the table 12, their rotation ceases when the pinions 49 leave the gear 50.

The table 12 and gear 50 are operated in opposite directions through the medium of a driving shaft 51 that is journaled in suitable bearings carried by the base 1, one end of said shaft 51 having a driving pulley 52, and the other end being provided with a bevel pinion 53 that engages a horizontally-disposed bevel gear 54 carried by a vertically-arranged stub shaft 55. The upper end of this shaft is mounted in the bearing arm 11, and arranged at the upper portion of the shaft 55 is a pinion 56 that engages the gear 50 and imparts rotation to the latter. Between the pinion 56 and the bevel gear 54 the shaft 55 is also provided with a spur gear 57 that engages a pinion 58 carried by a second stub shaft 59 that is parallel with the shaft 55, and which is also arranged in the bearing arm 11. At the upper end of the shaft 59 a pinion 60 is arranged, said pinion engaging a gear 61 that is connected to the under side of the table 12, and through the medium of which the table 12 is rotated in a direction opposite to the direction of rotation of the gear 50. The gear 61 is, of course, concentric with the standard 5.

By employing the gearing above described, and the adoption of a spur gear for rotating the supports 15 by engagement with the pinions 49 carried thereby, there is positive movement of the supports 15 as they enter and pass through the singeing zone; consequently, rotary movement of the supports 15 is assured during the singeing of the stockings carried thereby; uniformity of singeing is obtained, and liability of scorching is reduced to a minimum.

Figure 11:
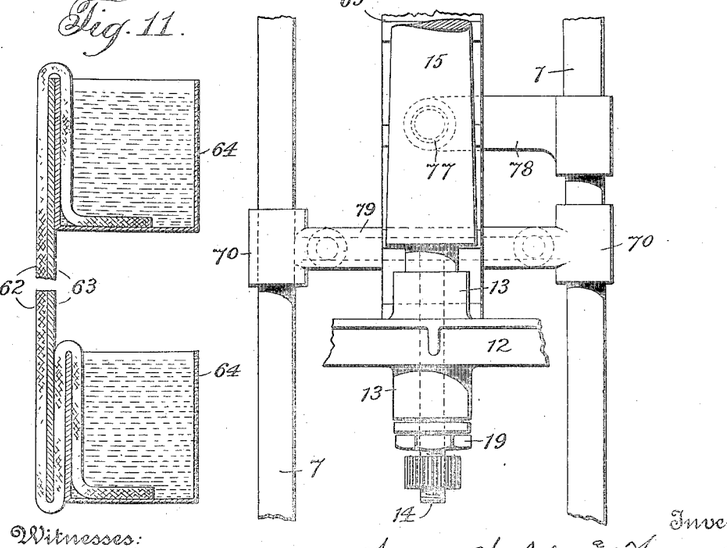
Fig. 11 is a vertical transverse sectional view of the absorbent pad, its support, and the water receptacles for extinguishing the ignited portions of the singed stockings arising during the singeing operation.

In the operation of singeing stockings it frequently occurs that projecting or raveled ends of threads become ignited by the singeing flames. Unless provision is made to extinguish these ignited portions, there is possibility of the mass of the singed stockings becoming fired. As a precautionary measure it has been the practice to dampen the mass of singed stockings in order to extinguish the smoldering threads or raveled portions that may inadvertently enter the mass. This, however, does not insure extinguishing the ignited stockings. To provide for the immediate extinguishing of any of the ignited portions after the stockings leave the burners, the present invention contemplates dampening or moistening the stockings before the latter are stripped from the supports 15, and for this purpose an absorbent pad 62 carried by a suitable support 63 is arranged in proximity to the path of travel of the supports 15. The pad 62 is of sufficient aera to cover the entire length of the supports 15, and the latter, with the singed stockings thereon, roll against this pad in the rotation of the table 12, so that all portions of the singed stockings are subjected to the dampening and moistening action of the pad 62. That said pad may be provided with sufficient moisture for the purposes intended, the ends thereof are immersed in water receptacles 64 arranged at the top and bottom of the support 63, the water being fed to the pad 62 by capillary attraction. It is, of course, obvious that the pad 62 is but one expedient that might be adopted for effecting extinguishment of the ignited portions of the stockings, so that the invention is in no wise limited to the use of an absorbent pad for this purpose, but other expedients may be resorted to and still be within the scope of the invention. The arrangement of the pad 62, its support 63 and the water receptacles 64 is clearly illustrated in Fig. 11.

Figure 9:
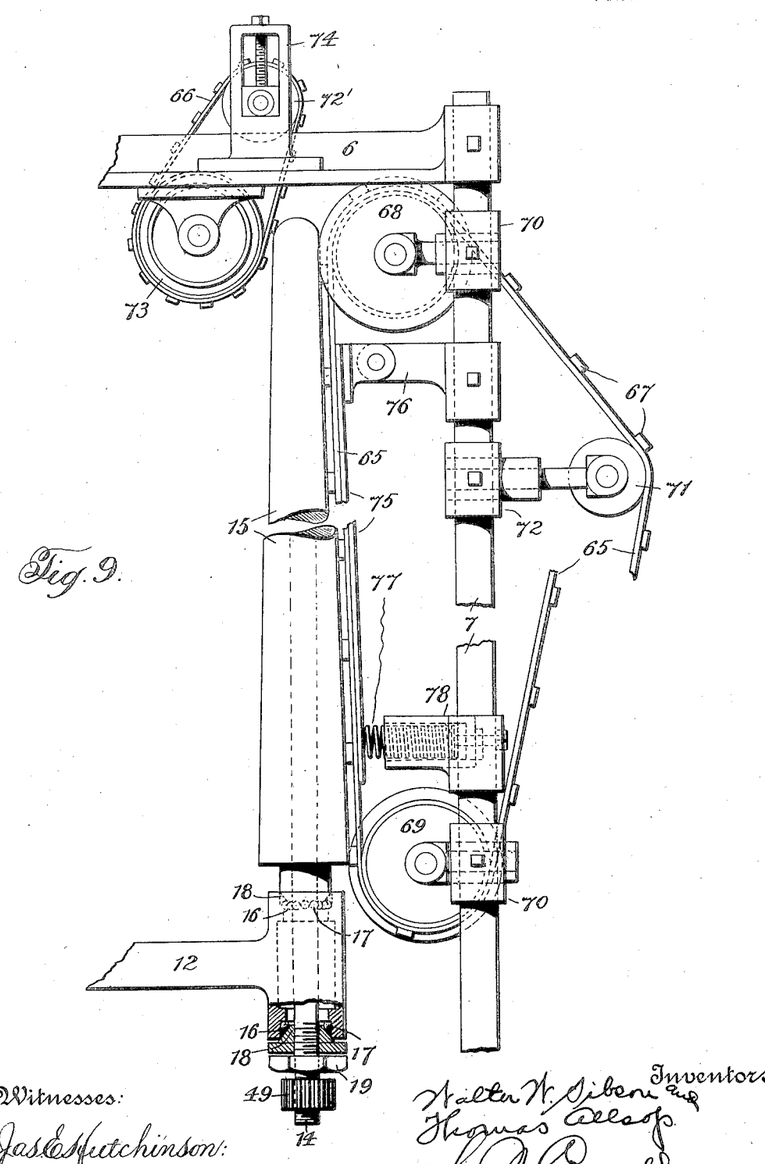
Fig. 9 is a detail elevation of the stripping mechanism.
Figure 10:
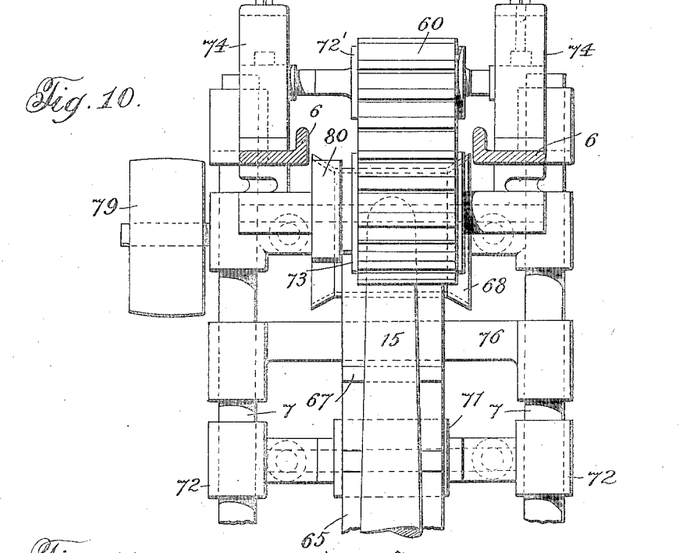
Fig. 10 is a similar view of the same mechanism, at right angles to that illustrated in Fig. 9.

By referring to Figs. 9 and 10 the means for automatically stripping the stockings from the supports 15 will be clearly seen. These means comprise a main apron conveyer 65 and an auxiliary apron conveyer 66, mounted in such relation to each other that the upper ends of the supports 15 will pass therebetween. Each of these conveyers is provided at spaced intervals with transversely-extending cleats 67 whereby to engage the stockings upon the supports 15 and draw the same therefrom. The main conveyer 65 passes over upper and lower drums 68 and 69, each of which is journaled in suitable bearings 70 that are adjustably mounted upon the stay rods 7. The upper drum 68 is dished, and thereby prevents the conveyer 65 passing over the ends thereof. Coöperating with the conveyer 65 is a tension roll 71 that is also mounted in suitable bearings 72 adjustably arranged upon the stay rods 7. This roll may be employed to regulate the slackness of the conveyer 65, but is primarily designed to impart to the upper portion of the forward reach of said conveyer a certain degree of inclination, and thus guide the singed stockings in a downward and forward direction from the machine as the stockings are stripped from the supports 15. To assist in this discharge of the singed stockings, and also in their stripping from the supports 15, is the function of the auxiliary conveyer 66, which latter works upon upper and lower rolls 72' and 73, the former being mounted in adjustable bearings 74 carried by the yoke 6, and said conveyer 66 is positioned in the divided portion of the yoke 6, being arranged in inclined relation to the supports 15, and engaging the upper ends thereof. By means of this arrangement the conveyer 66 initiates movement of the toe portion of the stocking from each of the supports 15 as the latter enter between said conveyers, and the rear reach of the conveyer 65, moving in an upward direction, acts to draw the leg portion of the stocking upwardly on the supports 15. As the stocking passes from the upper end of the support the conveyer 66 directs the same forwardly onto the conveyer 65, and the stocking follows the latter and is discharged from the machine in the manner previously described.

In order that the rear reach of the conveyer 65 may properly act upon the leg portion of the stockings a presser plate 75 is employed, said plate being pivoted at its upper end to a suitable support 76 that is adjustably mounted upon the stay rods 7. Arranged at the lower end of the plate 75 is a spring 77 that exerts its tension to force said plate against the rear reach of the conveyer, and thus force the latter into contact with the stockings on the respective supports, and said spring 77 is received by a socketed supporting arm 78 that is adjustably mounted upon one of the stay rods 7.

The conveyers 65 and 66 are operated by pulleys 79 and 80, receiving their power from any suitable source.

In the operation of the herein described machine, rotation is imparted to the shaft 51, and through the connecting gearing described the table 12 is caused to rotate in a direction to pass the supports 15 successively to and past the singeing burners, simultaneously with which rotation the gear 50 operates in a reverse direction. An operative or operatives positions the stockings upon the several forms as they pass toward the singeing burners, and when the stockings enter the singeing zone the burners are caused to swing upon their supports in the manner previously described and follow the stockings until the limit of the swinging movement is reached. During this period the singeing flames attack the loose fibers of the stockings, at which time the supports 15 are being rotated in the sockets 13, thereby exposing the entire surface of the stockings to the singeing flames, the rotary movement being caused by the engagement of the pinions 49 with the gear 50, as also previously described. As the singed stockings pass out of the singeing zone, they are brought into contact with the absorbent pad 62, and by this contact are rolled along said pad, becoming moistened thereby in order to extinguish any ignited portions, and after leaving said pad the stockings successively enter the space between the stripping conveyers 65 and 66. As the contiguous reaches of these conveyers move in an upward direction, the stockings are removed from the supports 15, being deflected by the auxiliary conveyer 66 to the inclined portion of the conveyer 65, whereby they are discharged from the machine. After leaving the stripper mechanism the supports 15 receive additional unsinged stockings, and this cycle of operations continues.

From the foregoing it will be noted that the present invention provides a machine having means by which the stockings, as they approach the singeing zone, are caused to move in such manner as to expose all the surface thereof to the singeing flames, this movement being essentially separate and distinct from the travel of the stockings to and through the singeing flames, and through which medium a uniform exposure is effected without liability of scorching the body of the stockings; that the burners of the machine move in relation to the movement of the stockings, whereby the flames meet the stockings and follow the latter as they advance, thus being confined and concentrated upon the goods, and returning to meet the next succeeding stocking, so that in the operation of the machine the gas employed as the singeing agent is used with the greatest degree of economy; that provision is made for extinguishing any portions of the stockings that may be ignited during the singeing operation, thus reducing liability of firing the mass of singed stockings to a minimum, and that by the employment of the novel form of stripper streaking or marking of the goods in their removal from the supports is avoided, the cleats of the apron conveyers acting upon the stockings in such manner as to prevent this streaking or marking.

Having thus described the invention, what is claimed as new, and desired to be secured by Letters Patent, is:—

1. In a machine of the class described, means for singeing the articles, means for supporting the articles to be singed, means for feeding the articles relatively to the singeing means, and means for causing the singeing means to move with the articles during the singeing operation.

2. In a machine of the class described, means for singeing the articles, means for supporting the articles to be singed, means for feeding the articles relatively to the singeing means, means for causing the singeing means to move with the articles during the singeing operation, and means for causing relative movement between the articles and the singeing means while the articles are in the singeing zone.

3. In a machine of the class described, means for singeing the articles, means for supporting the articles to be singed, means for feeding the articles through the singeing means, means for causing the singeing means to move with the article during the singeing operation, and means for imparting movement to the articles while in the singeing zone for effecting uniform exposure of the articles to the singeing means.

4. In a machine of the class described, means for singeing the articles, means for supporting the articles to be singed, means for feeding the articles through the singeing means, means for rotating the article-supporting means during the singeing operation for effecting uniform exposure of the articles to the singeing means, and means for causing the singeing means to move with the articles during the singeing operation.

5. In a machine of the class described, means for singeing the articles, a movable table, supports carried by said table for the articles to be singed, and means for causing the singeing means to move with said supports during the singeing operation.

6. In a machine of the class described, means for singeing the articles, a movable table, supports carried by said table for the articles to be singed, means for causing relative movement between the said supports and the singeing means while the articles are in the singeing zone for effecting uniform exposure of the articles to the singeing means, and means for causing the singeing means to move with said supports during the singeing operation.

7. In a machine of the class described, means for singeing the articles, a movable table, supports carried by said table for the articles to be singed, means for rotating said supports while in the singeing zone for effecting uniform exposure of the articles to the singeing means, and means for causing the singeing means to move with said supports during the singeing operation.

8. In a machine of the class described, means for singeing the articles, means for supporting the articles to be singed, said singeing means being mounted to swing in relation to the article-supporting means during the singeing operation, and means for feeding the articles relatively to said singeing means.

9. In a machine of the class described, means for singeing the articles, means for supporting the articles to be singed, said singeing means being mounted to swing in relation to the article-supporting means during the singeing operation, means for feeding the articles through said singeing means, and means for causing relative movement between said supporting means and the singeing means while in the singeing zone for effecting uniform exposure of the articles to the singeing means.

10. In a machine of the class described, means for singeing the articles, means for supporting the articles to be singed, means for feeding the articles through the singeing means, means for causing the singeing means to move with the articles during the singeing operation, and means for removing the singed articles from the supporting means.

11. In a machine of the class described, means for singeing the articles, means for supporting the articles to be singed, means for feeding the articles through the singeing means, means for imparting movement to the articles during the singeing operation for effecting uniform exposure of the articles to the singeing means, means for causing the singeing means to move with the articles during the singeing operation, and means for removing the singed articles from the supporting means.

12. In a machine of the class described, means for singeing the articles, means for supporting the articles to be singed, means for feeding the articles through the singeing means, and means for moistening the singed articles after the latter leave the singeing means to extinguish ignited portions arising incident to singeing.

13. In a machine of the class described, means for singeing the articles, rotatable supports for the articles to be singed, means for feeding the articles relatively to the singeing means, a support arranged in the path of movement of the singed articles, and a pad carried by said support and upon which said articles are carried for extinguishing ignited portions arising incident to singeing.

14. In a machine of the class described, means for singeing the articles, rotatable supports for the articles to be singed, means for feeding the articles relatively to the singeing means, a support arranged in the path of movement of the singed articles, and an absorbent pad carried by said support and upon which said articles are carried, said pad being adapted to receive a suitable medium for extinguishing ignited portions arising incident to singeing.

15. In a machine of the class described, means for singeing the articles, a movable table, supports carried by said table for the articles to be singed, an element associated with said table and movable in a direction reverse to the direction of movement of said table, and devices associated with said supports and coöperating with said element to actuate said supports while in the singeing zone for effecting uniform exposure of the articles to the singeing means, said devices being brought into coöperation with said element during the movement of said supports through the singeing zone.

16. In a machine of the class described, means for singeing the articles, a rotatable table, supports carried by said table for the articles to be singed, a rotatable element associated with said table and mounted eccentrically thereto, said element being rotatable in a direction reverse to the direction of rotation of said table, and devices associated with said supports and coöperating with said element to actuate said supports while in the singeing zone for effecting uniform exposure of the articles to the singeing means, said devices being brought into coöperation with said element during the movement of the supports through the singeing zone.

17. In a machine of the class described, a table, supports carried by said table for the articles to be singed, a burner associated with said table, and means for causing relative movement between the table and said burner, the latter being mounted to move with each of the supports as the latter pass the burner, and to return to meet each succeeding support as the same advances into the singeing zone.

18. In a machine of the class described, a table, supports carried by said table for the articles to be singed, a burner associated with said table and mounted to swing in relation thereto, means for causing relative movement between the table and said burner, means for causing the burner to swing with each of the supports as the latter pass the burner, and means for causing a positive return movement of the burner, whereby the latter is positioned to meet each succeeding support as the same advances into the singeing zone.

19. In a machine of the class described, a table, supports carried by said table for the articles to be singed, a burner associated with said table, means for causing relative movement between the table and said burner, a contact arm carried by the burner for causing the latter to swing with each of the supports as the latter pass the burner, and means for returning the burner to a position to meet each succeeding support as the same advances into the singeing zone.

20. In a machine of the class described, means for supporting the articles to be singed, a burner associated therewith, means for causing relative movement between said supporting means and said burner, and a shield associated with the burner for confining the singeing flames upon the articles as they are presented to the action of the burner.

21. In a machine of the class described, means for supporting the articles to be singed, a burner associated therewith, means for causing relative movement between said supporting means and said burner, and a deflector associated with the burner for directing the singeing flames upon the articles as they are presented to the action of the burner.

22. In a machine of the class described, means for supporting the articles to be singed, a burner associated therewith, means for causing relative movement between said supporting means and said burner, a shield associated with the burner and extending longitudinally thereof for confining the singeing flames upon the articles as they are presented to the action of the burner, and a deflector also associated with the burner for directing the singeing flames upon said articles during their presentation to the action of the burner.

23. In a machine of the class described, means for supporting the articles to be singed, a burner associated therewith, means for causing relative movement between said supporting means and said burner, and means for varying the singeing area of said burner.

24. In a machine of the class described, means for supporting the articles to be singed, a burner associated therewith, said burner being divided into a plurality of compartments, means for controlling the flow of the singeing medium to said compartments, whereby to vary the singeing area of said burner, and means for causing relative movement between said supporting means and said burner.

25. In a machine of the class described, means for supporting the articles to be singed, a burner associated therewith and comprising a supporting tube and a burner tube connected thereto, said burner tube being divided into a plurality of compartments, means for controlling the flow of the singeing medium to said compartments, whereby to vary the singeing area of said burner, and means for causing relative movement between said supporting means and said burner.

26. In a machine of the class described, means for supporting the articles to be singed, a burner, adjustable mountings for the ends of the burner, whereby the latter may be moved toward and away from said article-supporting means, and means for causing relative movement between said supporting means and the burner during the singeing operation.

27. In a machine of the class described, means for supporting the articles to be singed, a burner, adjustable mountings for the ends of the burner, whereby the latter may be moved toward and away from said article-supporting means, means for effecting longitudinal adjustment of the burner, and means for causing relative movement between said supporting means and the burner during the singeing operation.

28. In a machine of the class described, means for supporting the articles to be singed, a burner associated therewith, means for causing relative movement between said supporting means and said burner, means for supplying said burner with the singeing medium, and a yielding adjustable connection between said burner and said supplying means.

29. In a machine of the class described, means for supporting the articles to be singed, a burner associated therewith and mounted to swing in relation thereto, means for causing relative movement between said supporting means and said burner, means for supplying said burner with the singeing medium, and a yielding adjustable connection between said burner and said supplying means to permit swinging of said burner.

30. In a machine of the class described, means for supporting the articles to be singed, a burner associated therewith and comprising a supporting tube and a burner tube connected thereto, said burner being mounted to swing in relation to the supporting means, means for causing relative movement between said supporting means and said burner, means for supplying said burner with the singeing medium, and a yielding adjustable connection between said supporting tube of the burner and said supplying means to permit swinging of said burner.

31. In a singeing machine, spark extinguishing means, and means for moistening said means.

32. In a singeing machine, absorbent spark extinguishing means, and means for moistening said means.

In testimony whereof we affix our signatures, in the presence of two witnesses.

WALTER W. SIBSON.
THOMAS ALLSOP.

Witnesses:
LAUTARO VILLARROEL,
HENRY P. HARPER.